US010243331B2

(12) United States Patent
Roe et al.

(10) Patent No.: US 10,243,331 B2
(45) Date of Patent: Mar. 26, 2019

(54) OPEN RELAY DEVICE AND SYSTEM

(71) Applicant: Bell Helicopter Textron Inc., Fort Worth, TX (US)

(72) Inventors: Jayson David Roe, Hurst, TX (US); Douglas J. Lindeman, Jr., Hurst, TX (US); Jason Kyle Mann, Pasadena, CA (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 15/664,308

(22) Filed: Jul. 31, 2017

(65) Prior Publication Data

US 2019/0036309 A1    Jan. 31, 2019

(51) Int. Cl.
*H02B 1/04*     (2006.01)
*B64D 43/00*    (2006.01)
*B64C 27/04*    (2006.01)

(52) U.S. Cl.
CPC ............. *H02B 1/04* (2013.01); *B64D 43/00* (2013.01); *B64C 27/04* (2013.01)

(58) Field of Classification Search
CPC ...................................................... H02B 1/04
USPC ................................ 361/216–218, 636, 752
See application file for complete search history.

(56) References Cited

U.S. PATENT DOCUMENTS

| | | | | |
|---|---|---|---|---|
| 5,466,974 A | * | 11/1995 | Sutrina | H02B 1/04 307/38 |
| 8,890,355 B2 | * | 11/2014 | Maier | H02G 3/00 244/118.5 |
| 2004/0206537 A1 | | 10/2004 | Marsh et al. | |
| 2015/0028668 A1 | * | 1/2015 | Smith | B60R 16/0238 307/9.1 |
| 2015/0102663 A1 | * | 4/2015 | Brouwer | B60R 16/0238 307/9.1 |
| 2015/0236507 A1 | * | 8/2015 | Burant | H02H 3/105 307/23 |
| 2017/0008638 A1 | * | 1/2017 | Wavering | H02B 1/21 |

FOREIGN PATENT DOCUMENTS

EP       2779422 A1    9/2014
WO    2006124026 A1   11/2006

* cited by examiner

*Primary Examiner* — Mukund G Patel
(74) *Attorney, Agent, or Firm* — Slater Matsil, LLP

(57) ABSTRACT

A an open relay device and system includes a chassis having one or more openings; external connectors on a first wall of the chassis, the external connectors having a plurality of external connection terminals; ground bussing modules attached to a second wall of the chassis; junction bussing modules attached to a third wall of the chassis; relay sockets attached to a fourth wall of the chassis; and wiring electrically connecting the external connectors to the ground bussing modules, the junction bussing modules, and the relay sockets, the wiring further electrically connecting the relay sockets to the junction bussing modules and the ground bussing modules.

20 Claims, 7 Drawing Sheets

OPEN RELAY DEVICE AND SYSTEM

TECHNICAL FIELD

The present invention relates generally to a system and method for a relay, and, in particular embodiments, to an open relay device and system.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

Fly-by-wire (FBW) systems have been introduced in rotorcraft to assist pilots in stably flying the rotorcraft and to reduce workload on the pilots. In FBW rotorcraft, the pilot flight controls and instrument panels may be electronic devices that are electrically connected to one another, a flight control computer, and/or flight control devices. All of these devices are electrically connected with wiring throughout the rotorcraft.

SUMMARY

In accordance with a preferred embodiment of the present invention, a device includes: a chassis having one or more openings; external connectors on a first wall of the chassis, the external connectors having a plurality of external connection terminals; ground bussing modules attached to a second wall of the chassis; junction bussing modules attached to a third wall of the chassis; relay sockets attached to a fourth wall of the chassis; and wiring electrically connecting the external connectors to the ground bussing modules, the junction bussing modules, and the relay sockets, the wiring further electrically connecting the relay sockets to the junction bussing modules and the ground bussing modules.

In accordance with a preferred embodiment of the present invention, a rotorcraft includes: a structure; an instrument panel; power supplies; a basic ship wiring harness including wires connected to the instrument panel and the power supplies; and an open relay panel mounted to the structure, the open relay panel including: external connectors connected to the basic ship wiring harness, the external connectors having a plurality of external connection terminals connected to the instrument panel and the power supplies; bussing modules; and wiring that is electrically connecting the external connectors to the bussing modules, where signals carried by the basic ship wiring harness are communicated over the bussing modules with the wiring.

In accordance with a preferred embodiment of the present invention, a method includes: attaching an add-in kit to a rotorcraft; running a wiring harness for the add-in kit to an open relay panel, the open relay panel attached to a structure of the rotorcraft, the open relay panel connected to wiring harness for one or more devices of the rotorcraft; and connecting wires of the wiring harness for the add-in kit to terminals of one or more busses in the open relay panel, the terminals of the one or more busses electrically connected to the one or more devices of the rotorcraft.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

A rotorcraft may be compatible with one or more add-in kits that may be separately installed after manufacture of the rotorcraft. An open relay device and system is disclosed, according to some embodiments. In particular, signals from various electrical components of the rotorcraft—such as the instrument panel, pilot flight controls, power sources, and the like—are connected to an open relay panel. The open relay panel has modules and terminals, and signals for the various electrical components of the rotorcraft are communicated (e.g., transmitted and received) over the modules and terminals of the open relay panel. The signals may include any signals that may be needed by add-in kits. When an add-in kit is installed in the rotorcraft, the wiring harness for the add-in kit may be routed to the open relay panel, and wires in the harness may be tapped into terminals that bus the signals needed by the add-in kit. By pre-wiring all needed signals at the open relay panel, new wiring to the various electrical components is not needed for each add-in kit. Installing an add-in kit in rotorcraft with a closed panel may involve opening a sealed box, crimping and adding wires to connect the add-in kit harness to the needed signals, potentially drilling holes for new connectors, and then bonding and re-sealing the box. Because the open relay panel is open (e.g., not sealed), and has easily accessible terminals, installing add-in kits may avoid breaking open the open relay panel or crimping new wires to the terminals. Further, installations of several add-in kits may avoid breaking into the wiring harnesses of the rotorcraft multiple times.

Figure 1:
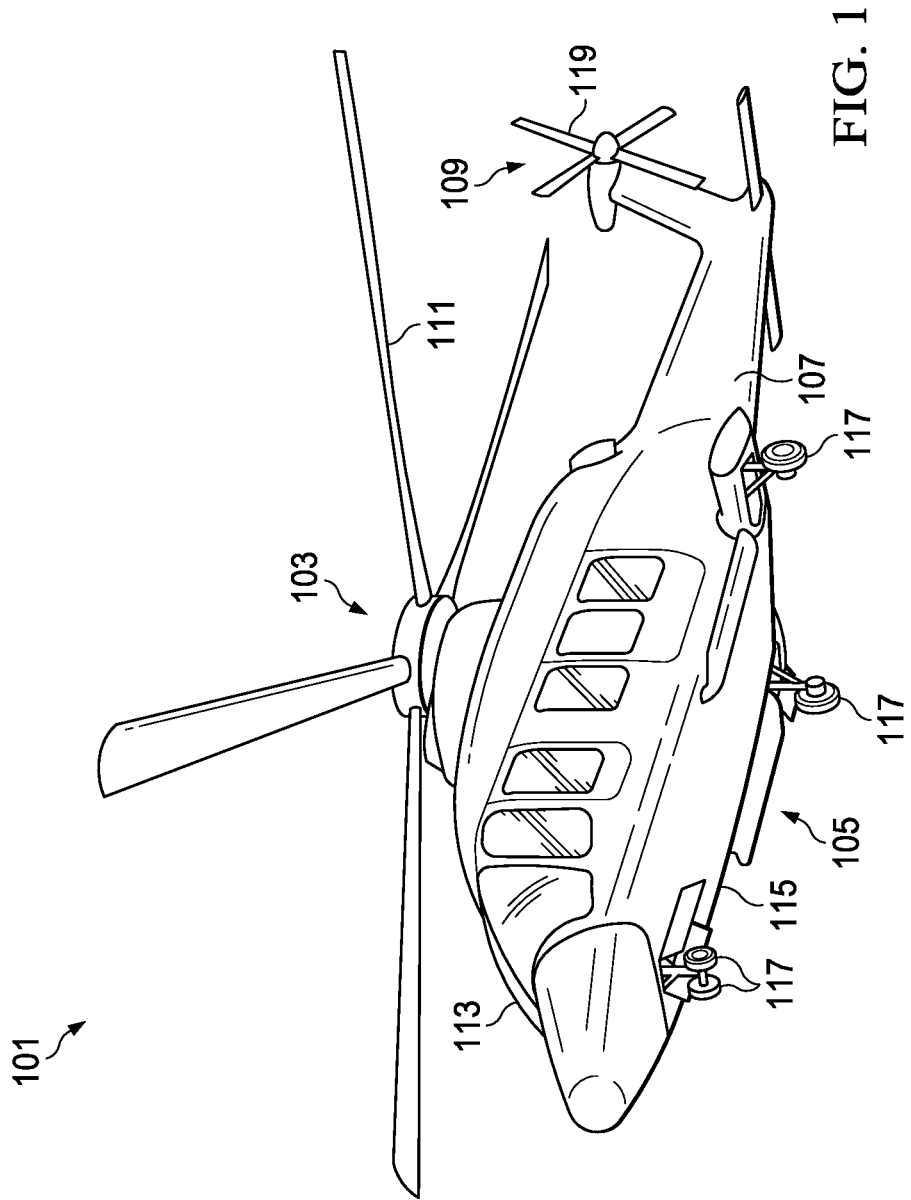
FIG. 1 illustrates a rotorcraft, according to some embodiments.

FIG. 1 illustrates a rotorcraft 101, according to some embodiments. The rotorcraft 101 includes a main rotor system 103, a fuselage 105, and a tail boom 107. The rotorcraft 101 also includes an anti-torque system, which may include a tail rotor system 109, no-tail-rotor (NOTAR), or a dual main rotor system. According to some embodiments, the rotorcraft 101 is controlled by a fly-by-wire (FBW) control system. Various pilot flight controls, flight control devices, actuators, instrument panels, aircraft sensors (e.g., altimeters, rotorhead speed sensors, air pressure sensors, etc.), and the like of the rotorcraft 101 are electrically connected to flight control computers (not shown), which implement some or all of the functionality of the FBW control system in software, firmware, and/or hardware.

The main rotor system 103 includes a plurality of main rotor blades 111. The pitch of the main rotor blades 111 may be controlled by a swashplate (not shown) in order to selectively control the attitude, altitude and movement of the rotorcraft 101. Main rotor actuators (not shown) adjust the swashplate, which collectively and/or cyclically changes the pitch of the main rotor blades 111. In some embodiments, the FBW control system sends electrical signals that control the main rotor actuators. The main rotor actuators may be hydraulically actuated, and may be connected to one or more hydraulic pumps or the like by hydraulic lines or fittings that are disposed in a fume tight recovery system to contain any potential leakage of hydraulic fluids or vapor The fuselage 105 includes a cockpit 113, a passenger compartment or cargo area 115, and landing gear 117. The cockpit 113 includes displays, controls, and instruments. The landing gear 117 supports the rotorcraft 101 during landing or when the rotorcraft 101 is at rest on the ground. The fuselage 105 forms a main structure of the rotorcraft 101, and is connected to the main rotor system 103 such that main rotor system 103 and the main rotor blades 111 move the fuselage 105 through the air in flight.

In rotorcraft with the tail rotor system 109, the tail boom 107 connects the tail rotor system 109 to the fuselage 105. The tail rotor system includes tail rotor blades 119, which counter torque effect created by the main rotor system 103. The pitch of the tail rotor blades 119 is collectively changed in order to vary thrust of the anti-torque system, providing directional control of the rotorcraft 101. The pitch of the tail rotor blades 119 is changed by one or more tail rotor actuators (not shown). Similar to the main rotor actuators, the FBW control system may send electrical signals to control the tail rotor actuators, and the tail rotor actuators may be hydraulically actuated.

A pilot may manipulate one or more pilot flight controls in order to achieve controlled aerodynamic flight of the rotorcraft 101. Inputs provided by the pilot to the pilot flight controls may be transmitted mechanically or electronically (for example, via the FBW control system) to flight control devices. Flight control devices may include devices operable to change flight characteristics of the rotorcraft 101, such as the main rotor actuators and the tail rotor actuators.

Although some embodiments are described with respect to a rotorcraft having the main rotor system 103, it should be appreciated that teachings of some embodiments may apply to other rotorcraft, such as other tilt rotor or helicopter rotor systems. It should also be appreciated that teachings of some embodiments may apply to aircraft other than rotorcraft, such as airplanes, unmanned aircraft, or the like. Further, although the rotorcraft 101 is depicted as having certain illustrated features, it should be appreciated that the rotorcraft 101 may have a variety of implementation-specific configurations. For example, the cockpit 113 may be configured to accommodate a pilot or a pilot and co-pilot, as illustrated. Likewise, in embodiments where the rotorcraft 101 is an unmanned aircraft, the cockpit 113 could be configured with limited functionality or could be eliminated entirely in order to save space and cost.

The rotorcraft 101 may be compatible with one or more add-in kits that may be separately installed after manufacture of the rotorcraft. The add-in kits may include devices that are attached to the rotorcraft 101, and those devices may include electrical devices that are wired to other devices of the rotorcraft 101. Because the rotorcraft 101 is compatible with add-in kits, a baseline model of the rotorcraft 101 may be initially manufactured, and then the add-in kits may be separately installed after initial manufacture of the rotorcraft 101.

Figure 2:
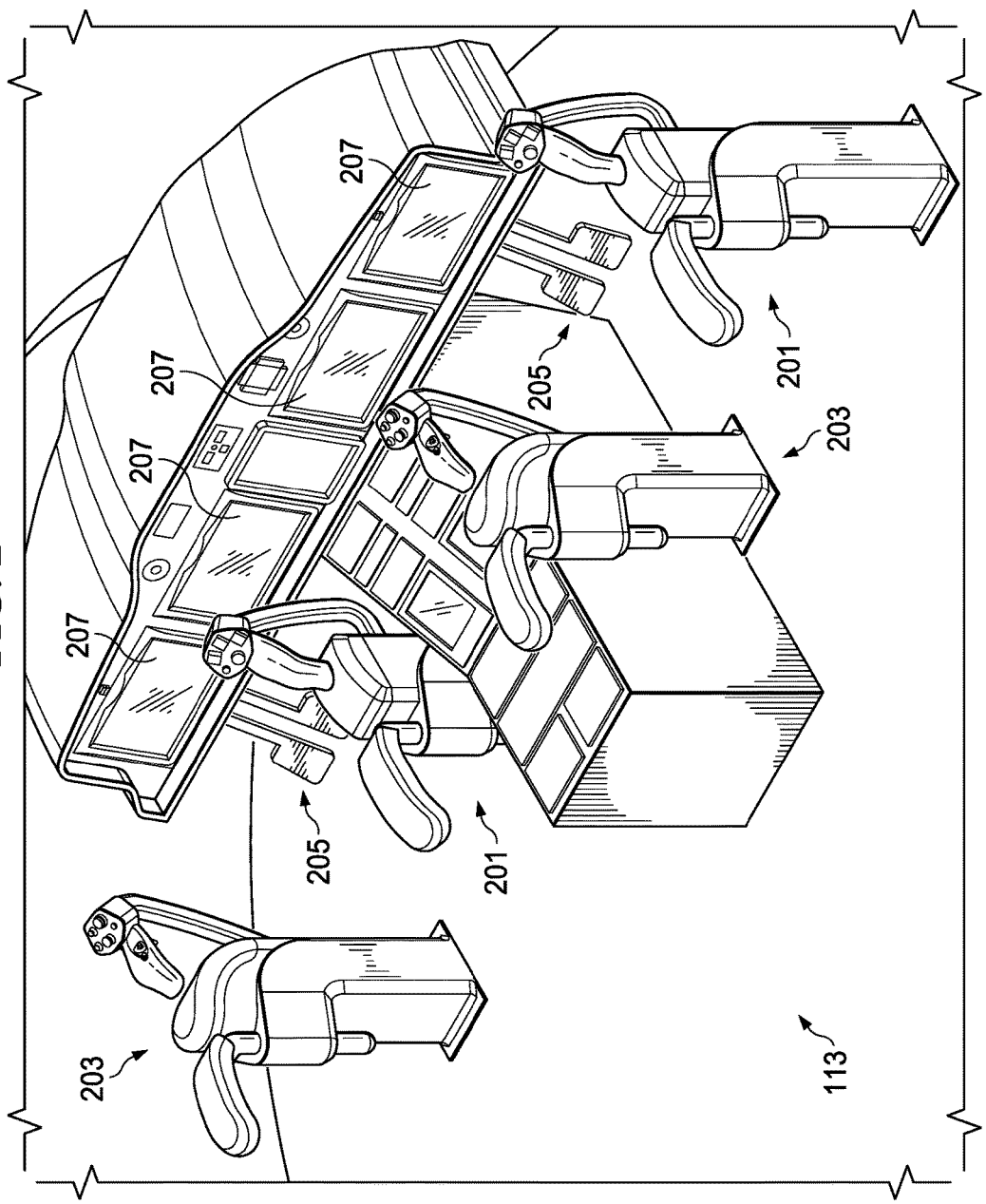
FIG. 2 illustrates a cockpit configuration, according to some embodiments.

FIG. 2 illustrates a configuration of the cockpit 113, according to some embodiments. The cockpit 113 includes one or more sets of pilot flight controls, which may include cyclic control assemblies 201, collective control assemblies 203, and pedal assemblies 205. In embodiments where the cockpit 113 is configured to accommodate a pilot and a co-pilot (both of which may be referred to as a "pilot" herein), one set of pilot flight controls assemblies is provided for each pilot. The cockpit 113 may also include one or more instrument panels 207.

The cyclic control assemblies 201 allow the pilot to cyclically adjust the pitch of the main rotor blades 111. Varied cyclic configurations of the main rotor blades 111 may cause the rotorcraft 101 to tilt in a direction specified by the pilot. To tilt forward and back (e.g., pitch) or side-to-side (e.g., roll), the angle of attack of the main rotor blades 111 may be altered with cyclic periodicity during rotation of the main rotor system 103, creating variable amounts of lift at varied points in the rotation cycle. The control system activates the main rotor actuators to cyclically adjust the swashplate in response to input from the cyclic control assemblies 201, which changes the cyclic configuration of the main rotor blades in.

The collective control assemblies 203 allow the pilot to collectively adjust the pitch of the main rotor blades in. Varied collective configurations of the main rotor blades 111 may change overall the lift produced by the main rotor blades 111. To increase or decrease the overall lift of the main rotor blades in, the pitch of each of the main rotor blades 111 may be collectively altered by equal amounts and at the same time, resulting in ascent, descent, acceleration, and deceleration. The control system activates the main rotor actuators to collectively adjust the swashplate in response to input from the collective control assemblies 203, which changes the collective configuration of the main rotor blades in.

Anti-torque pilot flight controls may allow a pilot to change the amount of anti-torque force applied to the rotorcraft 101. In rotorcraft with the tail rotor system 109, the anti-torque pilot flight controls include the pedal assemblies 205, which allow the pilot to change the amount of anti-torque force applied by changing the pitch of the tail rotor blades 119. The control system activates the tail rotor actuators to collectively adjust the pitch of tail rotor blades 119, which changes the thrust produced by the tail rotor system 109.

In some embodiments, the cyclic control assemblies 201, collective control assemblies 203, and pedal assemblies 205 may be used in the FBW control system. In the embodiment illustrated in FIG. 2, each of the cyclic control assemblies 201 is located to the right of a pilot seat, each of the collective control assemblies 203 is located to the left of a pilot seat, and each of the pedal assemblies 205 is located in front of a pilot seat. In other embodiments, the cyclic control assemblies 201, collective control assemblies 203, and pedal assemblies 205 may be located in any suitable location of a cockpit configuration.

In some embodiments, the cyclic control assemblies 201, collective control assemblies 203, and pedal assemblies 205 may be in mechanical communication with trim assemblies that convert mechanical inputs into flight control commands that are sent to the FBW control system. These trim assemblies may include, among other items, measurement devices for measuring mechanical inputs (e.g., measuring or otherwise determining input position) and trim motors for back-driving center positions of the cyclic control assemblies 201, collective control assemblies 203, or pedal assemblies 205.

The instrument panels 207 may be part of a glass flight deck that displays flight information. In some embodiments, the glass flight deck displays navigation information; performs communication and mapping functions; displays weather, radio, and/or traffic information; displays information from the FBW control system; and the like. In an embodiment, the glass flight deck may be an avionics suite such as a Garmin G1000® or the like.

The wiring for the various electrical components of the rotorcraft 101 without any add-in kits installed may be referred to herein as the "basic ship wiring." The basic ship wiring includes the wiring for all the devices of the rotorcraft 101, such as the cyclic control assemblies 201, collective control assemblies 203, pedal assemblies 205, instrument panels 207, power supplies, ground terminals, and the like, that are included with the rotorcraft 101 after it is manufactured and before add-in kits are installed. Signals carried over the basic ship wiring may include signals for: aircraft sensors; aircraft power and ground; signals associated with the instrument panels 207; signals carrying video feeds from camera that may be mounted on or in the rotorcraft 101; antenna signals; air data and flight control signals; and the like. The signals (e.g., sensor signals) may be analog or digital signals. Examples of aircraft sensors may include vibration sensors, tachometers, fluid pressure sensors, and sensors for determining the states of mechanical features, such as sensors for determining whether the aircraft doors are open or closed, and sensors for determining whether the aircraft wheels are bearing weight.

Figure 3A:
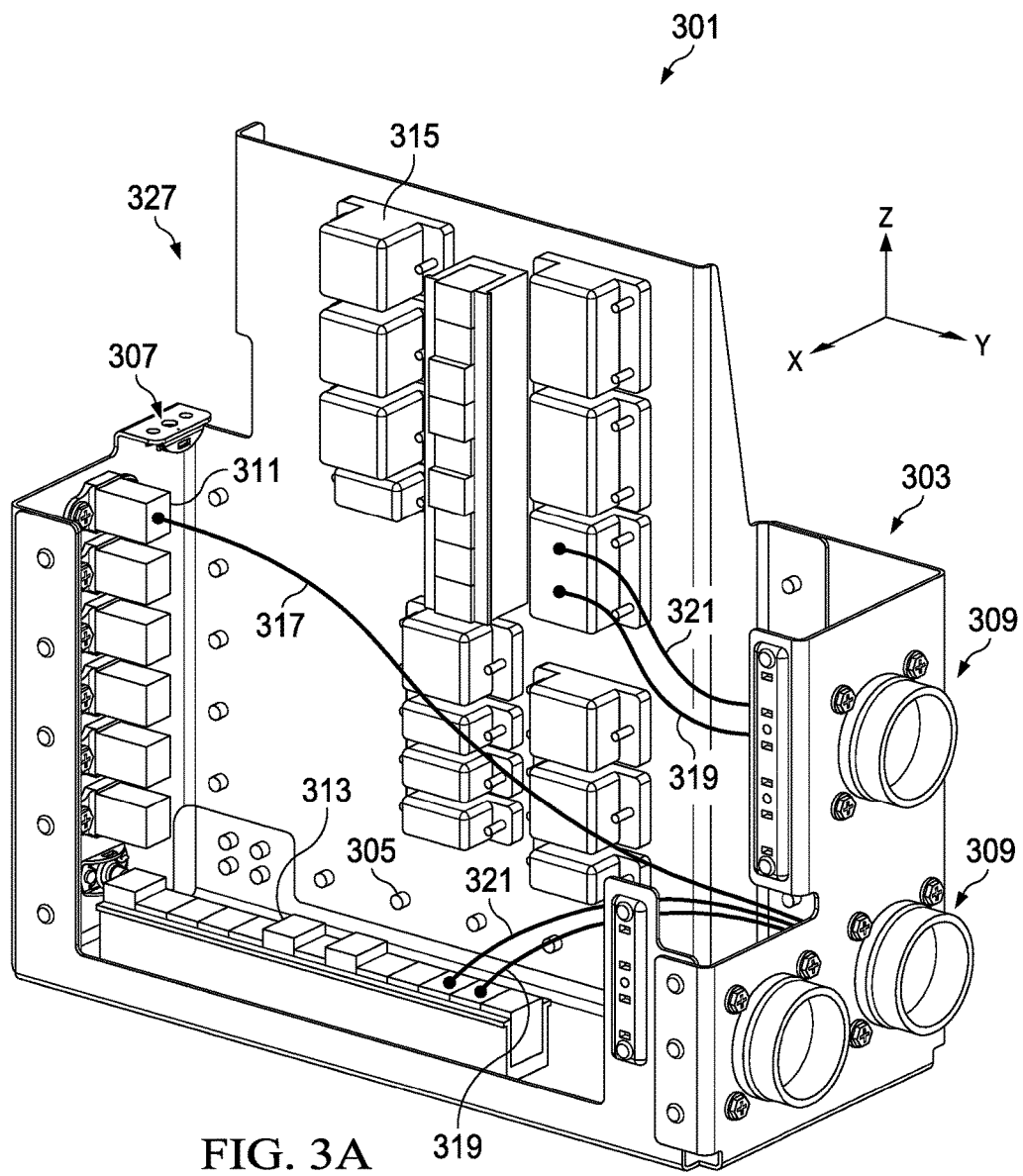
FIGS. 3A through 3C illustrate an open relay panel, according to some embodiments.
Figure 3B:
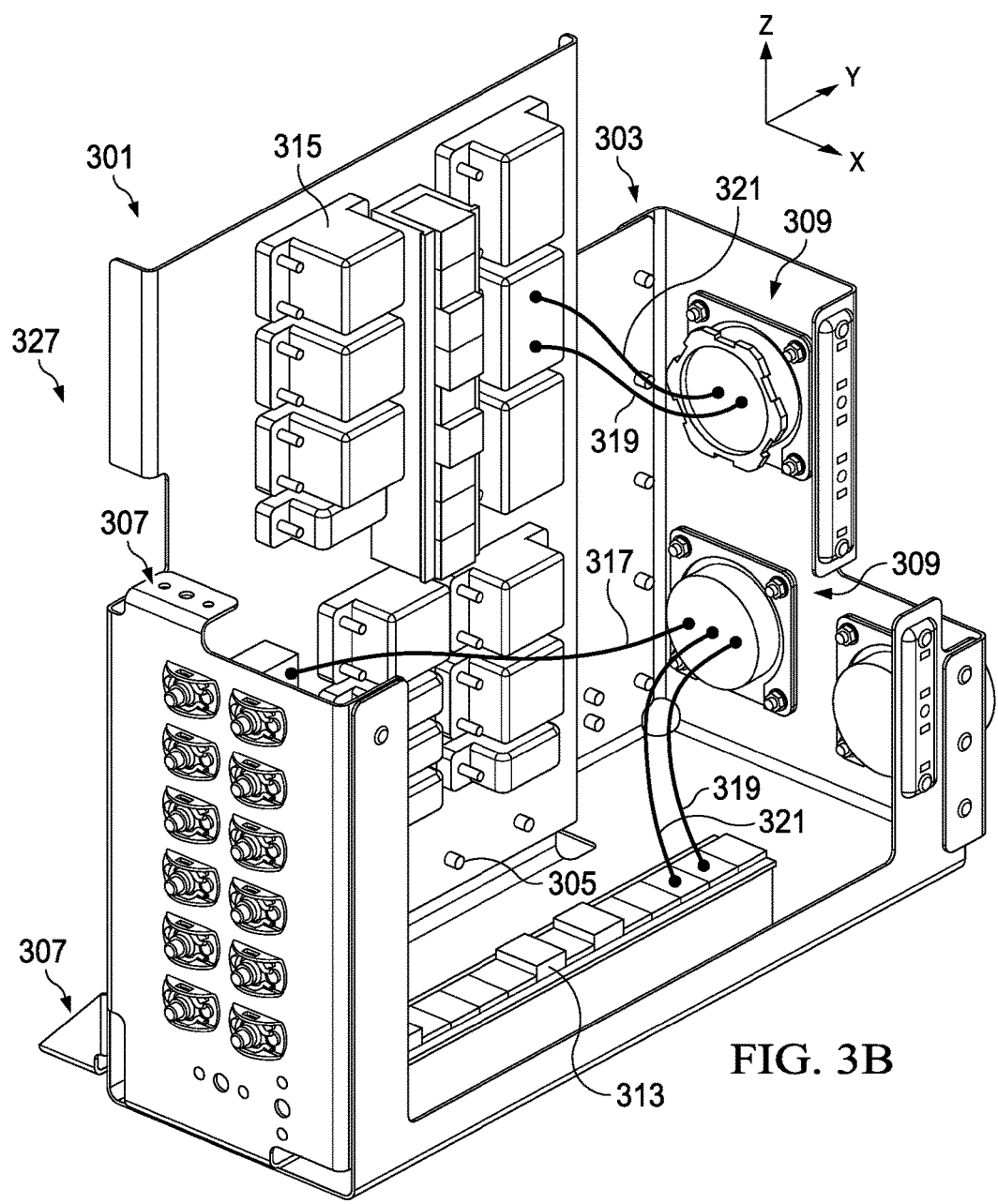
Figure 3C:
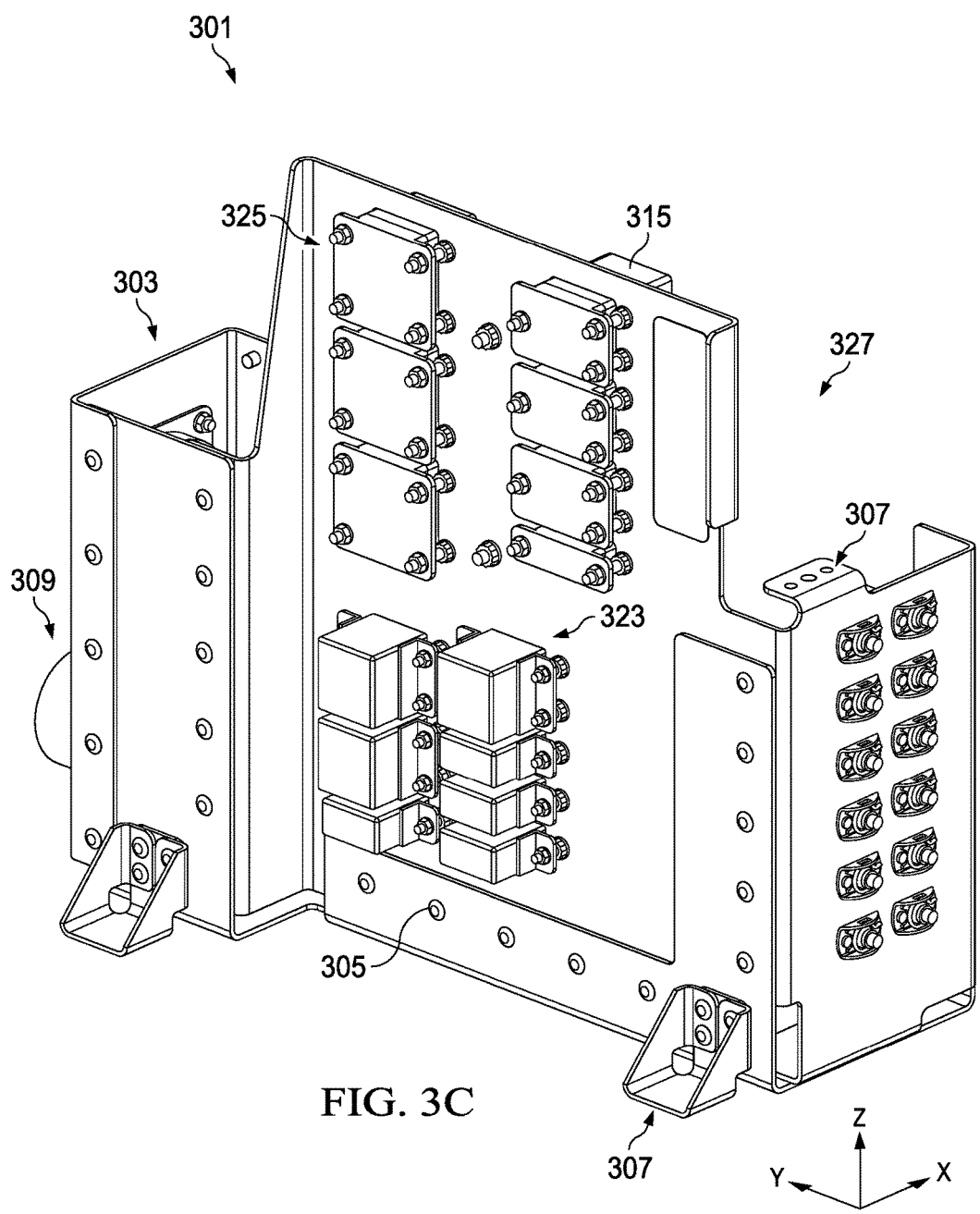

FIGS. 3A through 3C illustrate an open relay panel 301, according to some embodiments. The rotorcraft 101 may include several open relay panels 301 that are connected to some or all signals of the basic ship wiring. For example, the open relay panel 301 may be a forward relay panel that is located to the front of the rotorcraft 101. Likewise, the open relay panel 301 may be an aft relay panel that is located to the rear of the rotorcraft 101. The basic ship wiring for the rotorcraft 101 is terminated at the open relay panel 301. When installing an add-in kit that needs to access signals of the basic ship wiring, the wiring harness for the add-in kit is terminated at the open relay panel 301. Wiring the add-in kit may require terminating the add-in kit wiring harness at the open relay panel 301, and not at the various devices electrically connected with the basic ship wiring.

The open relay panel 301 is formed of a chassis 303 that includes one or more portions fastened together with fasteners 305, which may be rivets, screws, bolts, adhesives, welding, and the like. The chassis 303 may be formed of a metal such as aluminum, steel, or the like, and may be attached to the main structure of the rotorcraft 101 by anchors 307. The anchors 307 and the chassis 303 are formed from a conductive material, and may be grounded to the main structure of the rotorcraft 101, such as the fuselage 105 or the tail boom 107.

The chassis 303 has connectors 309 on at least one side. The connectors 309 extend through the side of the chassis 303, and form first portions (e.g., male portions) of harness fasteners that connect the basic ship wiring to the open relay panel 301. The connectors 309 are bolted to sides of the chassis 303, and may also be referred to herein as bulkhead connectors. The basic ship wiring is bundled into a wiring harness. The basic ship wiring harness terminates at plugs (not shown) that form second portions (e.g., female portions) of the harness fasteners. The plugs of the basic ship wiring harness mate to the bulkhead connectors 309, and may be connected during manufacture. When the open relay panel 301 is installed in the rotorcraft 101, the basic ship wiring harness plugs (e.g., the female portions of the harness fasteners) are mated to the bulkhead connectors 309 of the open relay panel 301 (e.g., the male portions of the harness fasteners). External connection terminals in the connectors 309 electrically connect to external connection terminals for the wires of the basic ship wiring harness, such that the signals transmitted and received over the basic ship wiring are routed to the terminals of the open relay panel 301. In an embodiment, the connectors 309 have a round shape and there are three connectors 309, although it should be appreciated that the connectors 309 may have any shape and there may be any quantity of them. In an embodiment, one of the connectors 309 connects to a wiring harness for the devices of the rotorcraft 101, and one of the connectors 309 connects to a wiring harness for power supplies and ground signals. In another embodiment, the wiring harnesses for the devices, power supplies, and ground signals of the rotorcraft 101 are not segregated to particular connectors 309. The devices of the rotorcraft 101 may include any devices connected by the basic ship wiring, such as the cyclic control assemblies 201, collective control assemblies 203, pedal assemblies 205, instrument panels 207, flight control computers, aircraft sensors, lighting devices, and the like. The signals for the devices may be analog or digital signals. In some embodiments, some or all of the devices are connected to the flight control computers. For example, the cyclic control assemblies 201, collective control assemblies 203, pedal assemblies 205, and aircraft sensors may be connected to the flight control computers, and the flight control computers connect to the open relay panel 301 via the basic ship wiring. Therefore, some or all of the devices may connect to the open relay panel 301 through the flight control computers.

The open relay panel 301 includes ground bussing modules 311, junction bussing modules 313, and relay sockets 315. The ground bussing modules 311, junction bussing modules 313, and relay sockets 315 act as connection points for the basic ship wiring, and each may be mounted or attached to a side of the open relay panel 301. The modules 311, 313, and 315 may be on a different or same wall as each other and as the connectors 309. The modules 311, 313, and 315 each have terminals, which may be solderless or solderable terminals, and connect to the wires of the basic ship wiring harness.

The open relay panel 301 is pre-wired such that pre-installed wiring branches out from the connection terminals of the connectors 309 and terminates at the various terminals of the ground bussing modules 311, the junction bussing modules 313, and the relay sockets 315. When the basic ship wiring harness is terminated at the connectors 309, the signals in the basic ship wiring are electrically routed to the modules 311, 313, and 315 by the pre-installed wiring.

Different subsets of the basic ship wiring are connected to each of the ground bussing modules 311, the junction bussing modules 313, and the relay sockets 315. In an embodiment, ground wires 317 are pre-wired to the ground bussing modules 311, and data signal wires 319 and power wires 321 are pre-wired to the junction bussing modules 313 and relay sockets 315. The ground bussing modules 311 are grounded via the chassis 303 and the anchors 307. The junction bussing modules 313 interconnect data signals of the various devices connected with the basic ship wiring (e.g., the cyclic control assemblies 201, collective control assemblies 203, pedal assemblies 205, instrument panels 207, flight control computers, aircraft sensors, lighting, and the like). The relay sockets 315 connect portions of the basic ship wiring to corresponding relays 323 mounted to the outside of the chassis 303.

The open relay panel 301 may have fewer relays 323 than relay sockets 315 when the basic ship wiring is installed during manufacture of the rotorcraft 101. Additional relays 323 may be subsequently installed as needed for add-in kits. The relays 323 plug into the back sides of corresponding relay sockets 315. Relay covers 325 may cover and protect the unused relay sockets 315, and may be, e.g., plastic caps. The relay sockets 315, relays 323, and relay covers 325 can be of varying part numbers. In an embodiment, the relays 323 are controlled by one or more signals in the basic ship wiring harness or add-in kit harness, and the relay sockets 315 for those relays 323 are pre-wired for those signals.

The open relay panel 301 is not sealed, but rather has openings 327 in the chassis 303. The openings 327 expose the ground bussing modules 311, junction bussing modules 313, and relay sockets 315 in the chassis 303. When installing an add-in kit for the rotorcraft 101 that needs to access signals of the basic ship wiring, the parts for the add-in kit are installed in the rotorcraft 101, and the wiring harness for the add-in kit is run to the open relay panel 301. The wiring harness for the add-in kit is routed through one or more of the openings 327, and terminated at the modules of the open relay panel 301 that are connected to the portions of the basic ship wiring needed by the add-in kit. The terminals of the modules 311, 313, and 315 may be, for example, solderless terminals, such as screw terminals, stab-in terminals, or the like. In embodiments where the modules 311, 313, and 315 use solderless terminals, the add-in kit wiring harness is terminated by inserting the wiring harness pins of the add-in kit into the terminals of the desired modules. If a new relay 323 is required for the add-in kit, then a relay 323 is connected to an unused relay socket 315, and the wires for the add-in kit are terminated in the relay socket 315 corresponding to the newly installed relay 323. Connecting the relay 323 includes electrically connecting the pins of the relay 323 to the corresponding relay socket 315.

Figure 4:
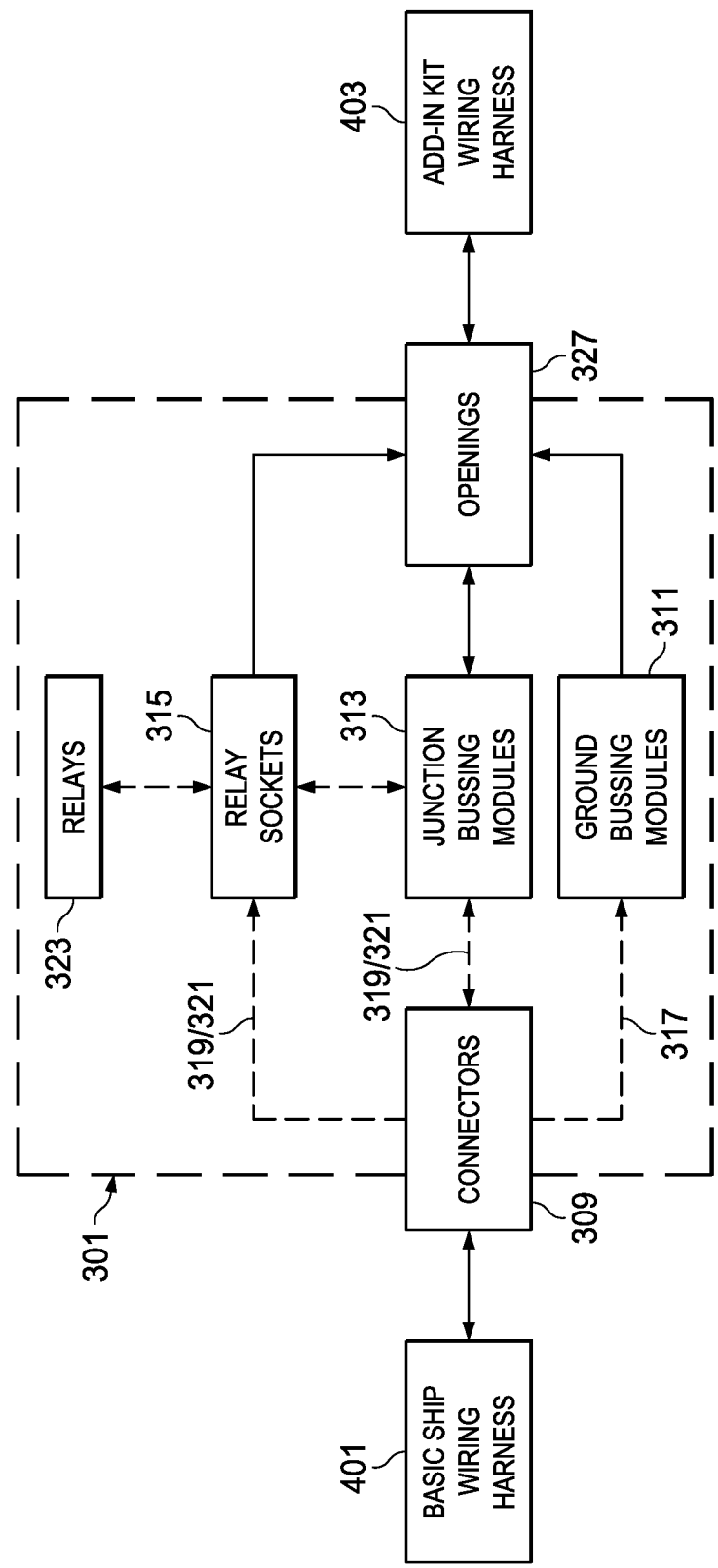
FIG. 4 is a block diagram of the open relay panel in use, according to some embodiments.

FIG. 4 is a block diagram of the open relay panel 301 in use when connected to the basic ship wiring harness 401 and an add-in kit wiring harness 403. The basic ship wiring harness 401 connects to the open relay panel 301 through the connectors 309, and the add-in kit wiring harness 403 is run to the open relay panel 301 and through the openings 327. The dashed connecting lines among the components of the open relay panel 301 indicate wires or pinned contacts that are pre-installed. In particular, for the pre-installed components, the relay sockets 315 are connected to the relays 323 with pinned contacts, and remaining components are connected with wires. As shown, the ground wires 317 are pre-wired to the ground bussing modules 311, and the data signal wires 319 and power wires 321 are pre-wired to both the junction bussing modules 313 and relay sockets 315. The pre-installed wires are connected to a first subset of the modules 311, 313, and 315. Remaining ones of the modules 311, 313, and 315 are open for add-in kit wiring, which may connect to the first subset of the modules 311, 313, and 315, or may connect to other subsets.

The relays 323 may be controlled with control signals that are transmitted on wires terminated at the junction bussing modules 313. Pre-wiring the control signals for the relays 323 may include connecting some of the pre-wired junction bussing modules 313 to some of the relay sockets 315 (e.g., the first subsets). The relays 323 may also be connected to ground, which may be accomplished by either grounding the relays 323 to the chassis 303, or by pre-wiring some of the pre-wired ground bussing modules 311 to some of the relay sockets 315 (e.g., the first subsets). Some of the basic functionality of the rotorcraft 101 uses the relays 323. As such, some of the relays 323 may be pre-wired in the open relay panel 301 such that the control, power, and ground signals for the needed relays 323 are connected to the basic functionality of the rotorcraft 101 through the basic ship wiring harness 401 when the open relay panel 301 is in use.

Some of the modules 311, 313, and 315 of the open relay panel 301 may be used for both the basic ship wiring harness 401 and the add-in kit wiring harness 403. For example, some of the relays 323 may be connected to both the basic ship wiring harness 401 and the add-in kit wiring harness 403. Likewise, signals from some devices of the rotorcraft 101, such as the flight control computers, aircraft sensors, lighting, and the like, may be connected to both the basic ship wiring harness 401 and the add-in kit wiring harness 403.

Figure 5:
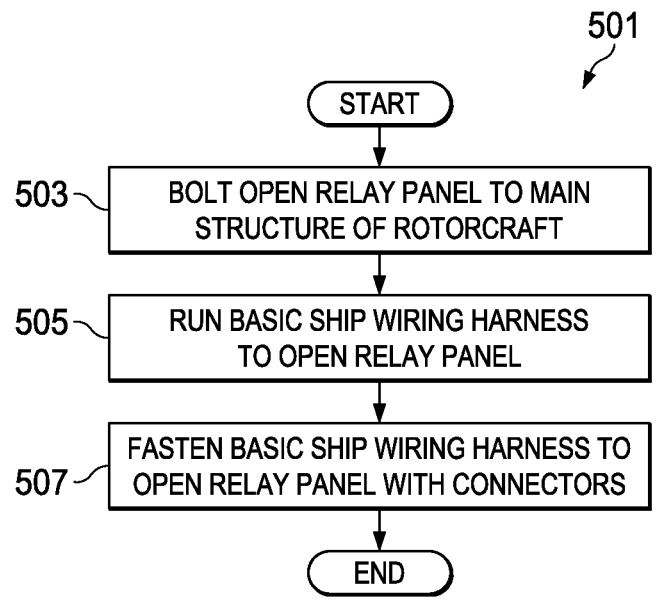
FIG. 5 illustrates a method for installing the open relay panel in the rotorcraft, according to some embodiments.

FIG. 5 illustrates a method 501 for installing the open relay panel 301 in the rotorcraft 101. The method 501 may be performed during manufacture of the rotorcraft 101. The open relay panel 301 is bolted to the main structure of the rotorcraft 101 (step 503). The basic ship wiring harness is run to the open relay panel 301 (step 505). The basic ship wiring harness is fastened to the open relay panel 301 with the connectors 309 (step 507).

Figure 6:
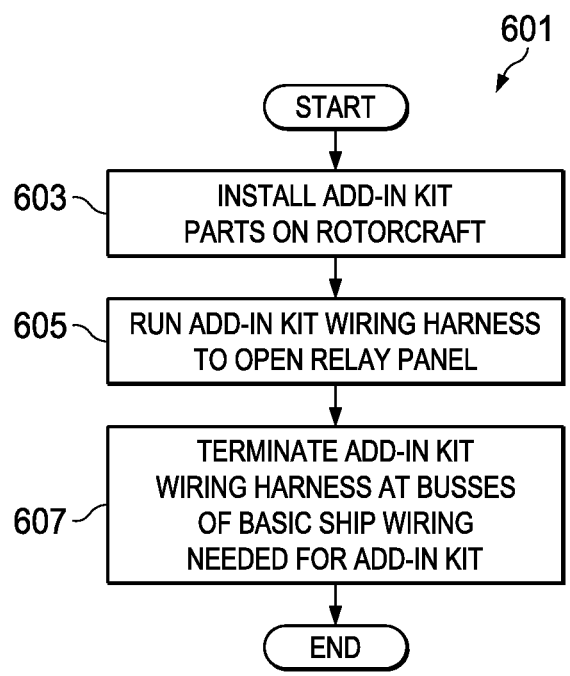
FIG. 6 illustrates a method for installing an add-in kit in the rotorcraft, according to some embodiments.

FIG. 6 illustrates a method 601 for installing an add-in kit in the rotorcraft 101. The method 601 may be performed after manufacture of the rotorcraft 101. The add-in kit parts are installed on the rotorcraft 101 (step 603). The add-in kit wiring harness is run to the open relay panel 301 (step 605). The add-in kit wiring harness is terminated at the busses of the basic ship wiring needed for the add-in kit (step 607).

Because wiring the add-in kit may only require terminating the add-in kit wiring harness at the open relay panel 301, installation of add-in kits may not require breaking apart the add-in kit or basic ship wiring harnesses to connect the add-in kit to the various devices of the rotorcraft 101. Repeated disassembly and reassembly of the wiring harnesses may thus be avoided. Further, the rotorcraft 101 may be manufactured by engineers or automated systems. The open nature and easy wiring capabilities of the open relay panel 301 allows add-in kits to be manually installed by less qualified technicians, and allows add-in kits to be installed after manufacture or sale of the rotorcraft 101. The simplified wiring may also allow add-in kits for the rotorcraft 101 to be more quickly installed.

In accordance with a preferred embodiment of the present invention, a device includes: a chassis having one or more openings; external connectors on a first wall of the chassis, the external connectors having a plurality of external connection terminals; ground bussing modules attached to a second wall of the chassis; junction bussing modules attached to a third wall of the chassis; relay sockets attached to a fourth wall of the chassis; and wiring electrically connecting the external connectors to the ground bussing modules, the junction bussing modules, and the relay sockets, the wiring further electrically connecting the relay sockets to the junction bussing modules and the ground bussing modules.

In some embodiments, the wiring electrically connects a first subset of the external connection terminals to the ground bussing modules, a second subset of the external connection terminals to the junction bussing modules, and a third subset of the external connection terminals to the relay sockets. In some embodiments, the device further includes anchors configured to be coupled to a main structure of a rotorcraft. In some embodiments, the external connectors are configured to be coupled to an aircraft sensor of the rotorcraft. In some embodiments, the external connectors are coupled to the aircraft sensor through a flight control computer. In some embodiments, the external connectors include: a first external connector configured to be coupled to an instrument panel of the rotorcraft; and a second external connector configured to be coupled to a power supply of the rotorcraft. In some embodiments, the anchors are electrically connected to the chassis. In some embodiments, the anchors and the chassis are formed from a conductive material. In some embodiments, the external connectors form first portions of harness fasteners. In some embodiments, the external connectors mate to second portions of the harness fasteners. In some embodiments, the external connectors are configured to accept a wiring harness of a rotorcraft. In some embodiments, the device further includes: relays electrically connected to the relay sockets, the relay sockets and the relays disposed on opposite sides of the chassis.

In accordance with a preferred embodiment of the present invention, a rotorcraft includes: a structure; an instrument panel; power supplies; a basic ship wiring harness including wires connected to the instrument panel and the power supplies; and an open relay panel mounted to the structure, the open relay panel including: external connectors connected to the basic ship wiring harness, the external connectors having a plurality of external connection terminals connected to the instrument panel and the power supplies; bussing modules; and wiring that is electrically connecting the external connectors to the bussing modules, where signals carried by the basic ship wiring harness are communicated over the bussing modules with the wiring.

In some embodiments, the bussing modules include: ground bussing modules grounded to the structure of the rotorcraft. In some embodiments, the bussing modules include: relay sockets connected to corresponding relays. In some embodiments, the rotorcraft further includes a flight control computer, and the relays include control terminals electrically connected to the flight control computer by one or more wires of the basic ship wiring harness. In some embodiments, the structure includes a fuselage, and the open relay panel is mounted to the fuselage. In some embodiments, the structure includes a tail boom, and the open relay panel is mounted to the tail boom.

In accordance with a preferred embodiment of the present invention, a method includes: attaching an add-in kit to a rotorcraft; running a wiring harness for the add-in kit to an open relay panel, the open relay panel attached to a structure of the rotorcraft, the open relay panel connected to wiring harness for one or more devices of the rotorcraft; and connecting wires of the wiring harness for the add-in kit to terminals of one or more busses in the open relay panel, the terminals of the one or more busses electrically connected to the one or more devices of the rotorcraft.

In some embodiments, running the wiring harness for the add-in kit includes: running the wiring harness through an opening in a side of the add-in kit.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
    a chassis having one or more openings in one or more walls of the chassis;
    external connectors on a first wall of the chassis, the external connectors having a plurality of external connection terminals;
    ground bussing modules attached to a second wall of the chassis;
    junction bussing modules attached to a third wall of the chassis;
    relay sockets attached to a fourth wall of the chassis;
    relays electrically connected to the relay sockets, the relay sockets and the relays being disposed on opposite sides of the chassis; and
    wiring electrically connecting the external connectors to the ground bussing modules, the junction bussing modules, and the relay sockets, the wiring further electrically connecting the relay sockets to the junction bussing modules and the ground bussing modules, the wiring being exposed by the openings in the walls of the chassis.

2. The device of claim 1, wherein the wiring electrically connects a first subset of the external connection terminals to the ground bussing modules, a second subset of the external connection terminals to the junction bussing modules, and a third subset of the external connection terminals to the relay sockets.

3. The device of claim 1, further comprising anchors configured to be coupled to a main structure of a rotorcraft.

4. The device of claim 3, wherein the external connectors are configured to be coupled to an aircraft sensor of the rotorcraft.

5. The device of claim 4, wherein the external connectors are coupled to the aircraft sensor through a flight control computer.

6. The device of claim 3, wherein the external connectors comprise:
    a first external connector configured to be coupled to an instrument panel of the rotorcraft; and
    a second external connector configured to be coupled to a power supply of the rotorcraft.

7. The device of claim 3, wherein the anchors are electrically connected to the chassis.

8. The device of claim 3, wherein the anchors and the chassis are formed from a conductive material.

9. The device of claim 1, wherein the external connectors form first portions of harness fasteners.

10. The device of claim 9, wherein the external connectors mate to second portions of the harness fasteners.

11. The device of claim 1, wherein the external connectors are configured to accept a wiring harness of a rotorcraft.

12. A rotorcraft comprising:
    a structure;

an instrument panel;
power supplies;
a basic ship wiring harness comprising wires connected to the instrument panel and the power supplies;
an open relay panel mounted to the structure, the open relay panel comprising:
 a chassis having an opening in a side of the chassis;
 external connectors connected to the basic ship wiring harness, the external connectors having a plurality of external connection terminals connected to the instrument panel and the power supplies;
 bussing modules; and
 wiring that is electrically connecting the external connectors to the bussing modules, wherein signals carried by the basic ship wiring harness are communicated over the bussing modules with the wiring; and
an add-in kit wiring harness extending though the opening in the side of the chassis of the open relay panel, the add-in kit wiring harness being terminated at the bussing modules.

13. The rotorcraft of claim 12, wherein the bussing modules comprise:
 ground bussing modules grounded to the structure of the rotorcraft.

14. The rotorcraft of claim 12, wherein the bussing modules comprise:
 relay sockets connected to corresponding relays, the wiring electrically connecting the external connectors to the relay sockets.

15. The rotorcraft of claim 14, wherein the rotorcraft further comprises a flight control computer, and wherein the relays comprise control terminals electrically connected to the flight control computer by one or more wires of the basic ship wiring harness.

16. The rotorcraft of claim 12, wherein the structure includes a fuselage, and the open relay panel is mounted to the fuselage.

17. The rotorcraft of claim 12, wherein the structure includes a tail boom, and the open relay panel is mounted to the tail boom.

18. A method comprising:
attaching an add-in kit to a rotorcraft, the rotorcraft comprising one or more devices, a basic ship wiring harness for the one or more devices, and an open relay panel attached to a structure of the rotorcraft, wherein the open relay panel comprises:
 a chassis having an opening in a side of the chassis;
 external connectors connected to the basic ship wiring harness;
 bussing modules; and
 wiring electrically connecting the bussing modules to the external connectors, signals carried by the basic ship wiring harness being communicated over the bussing modules with the wiring;
running a wiring harness for the add-in kit through the opening in the chassis of the open relay panel; and
connecting wires of the wiring harness for the add-in kit to the bussing modules of the open relay panel.

19. The method of claim 18, wherein the open relay panel further comprises relay sockets, the wiring electrically connecting the relay sockets to the external connectors, and further comprising:
 connecting a relay to an unused relay socket of the relay sockets; and
 connecting wires of the wiring harness for the add-in kit to the relay socket.

20. The method of claim 18, wherein the bussing modules comprise ground bussing modules and junction bussing modules, the ground bussing modules being grounded to the chassis, the junction bussing modules interconnecting data signals of the one or more devices.

\* \* \* \* \*